US009537955B1

(12) United States Patent
Hiremath

(10) Patent No.: US 9,537,955 B1
(45) Date of Patent: Jan. 3, 2017

(54) SENDING WEB CONTENT VIA ASYNCHRONOUS BACKGROUND PROCESSES

(71) Applicant: EMC Corporation, Hopkinton, MA (US)

(72) Inventor: Prakash S. Hiremath, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 255 days.

(21) Appl. No.: 14/300,524

(22) Filed: Jun. 10, 2014

(51) Int. Cl.
*H04L 29/08* (2006.01)
*G06F 17/30* (2006.01)

(52) U.S. Cl.
CPC ....... *H04L 67/125* (2013.01); *G06F 17/30861* (2013.01); *G06F 17/30902* (2013.01); *H04L 67/02* (2013.01); *H04L 67/1095* (2013.01)

(58) Field of Classification Search
CPC .................... G06F 17/30029; G06F 17/30873; G06F 17/30861; G06F 17/30902; G10L 13/043; H04L 63/1433; H04L 67/06; H04L 67/322; H04L 67/1095; H04N 21/4307; H04N 21/8456; H04N 7/173; H04W 88/06
See application file for complete search history.

(56) References Cited

U.S. PATENT DOCUMENTS

| | | | | |
|---|---|---|---|---|
| 2010/0071014 A1* | 3/2010 | Brown | .................... | H04N 7/173 725/110 |
| 2011/0088054 A1* | 4/2011 | Malik | .................... | G10L 13/043 725/29 |
| 2013/0013764 A1* | 1/2013 | Li | .................... | H04L 67/322 709/224 |
| 2013/0117418 A1* | 5/2013 | Mutton | .............. | H04N 21/8456 709/219 |
| 2013/0275429 A1* | 10/2013 | York | ................. | G06F 17/30029 707/737 |
| 2014/0342772 A1* | 11/2014 | Mulcahy | ............... | H04W 88/06 455/553.1 |
| 2014/0344334 A1* | 11/2014 | Trachtenberg | ..... | H04N 21/4307 709/203 |
| 2014/0344660 A1* | 11/2014 | Hayden | ............. | G06F 17/30873 715/229 |
| 2016/0072865 A1* | 3/2016 | Kaplinger | ............... | H04L 67/06 709/213 |
| 2016/0092683 A1* | 3/2016 | Mityagin | ............ | H04L 63/1433 726/24 |

OTHER PUBLICATIONS

Amit Agarwal, Download Files from the Web Directly to your Online Drives, Digital Inspiration, http://www.labnol.org/internet/download-files-directly/28049/, Jun. 10, 2014, pp. 1-2.

* cited by examiner

*Primary Examiner* — Le Luu
(74) *Attorney, Agent, or Firm* — Dergosits & Noah LLP; Todd A. Noah

(57) ABSTRACT

Sending web content via asynchronous background processes is described. A system receives, from a webserver, a request, from an end-user device, for web content. The system sends the web content from a content server to a customer storage server associated with the end-user device. The system sends the web content from the customer storage server to the end-user device via an asynchronous background process.

20 Claims, 3 Drawing Sheets

SENDING WEB CONTENT VIA ASYNCHRONOUS BACKGROUND PROCESSES

BACKGROUND

Many intranet or internet websites provide links for end-users to download web content. Typically, an end-user uses a device to access a website supported by a webserver, to search the website for web content to download, and to click on a link on the website to download the web content to the end-user's device. The webserver connects the end-user device to a centralized download server, which accesses the requested web content from a centralized storage and starts downloading the requested web content to the end-user device. These end-users may be spread across the globe, and may be connected via various connection speeds. Many technology enhancements have been implemented to speed up such downloads.

DETAILED DESCRIPTION

Challenges remain for end-users to download web content from websites. Typically, when downloading content from websites, an end-user will be distracted from completing other work while tracking the status of the download. Being required to connect to a centralized data center negatively impacts performance and customer experience for many global end-users. Slow internet speed connections cause long times for downloads. Downloading is a synchronous process, such that any interruption in power or connection results in a download failure that requires the download process to resume at the beginning of the process, even if the download process was 99% complete. Any downloaded web content is locked to the end-user device which was used to request the download, such that the downloaded web content is not available from any of the end-user's other devices.

Embodiments herein provide sending web content via asynchronous background processes. An end-user device's request for web content is received from a webserver. The web content is sent from a content server to a storage server associated with the end-user device. The web content is sent from the storage server to the end-user device via an asynchronous background process. For example, a customer uses an end-user device to request a white paper file from a website, and a webserver sends the request to a content server in a cloud computing system. The content server sends the white paper file to a customer storage server in the cloud computing system because the end-user has previously set up an account for the end-user device with the customer storage server. The customer storage server sends the white paper file to the end-user device via an asynchronous background process, which enables the end-user device to engage in a foreground process which is independent of the asynchronous background process. The end-user can use the end-user device for something else while the end-user device is receiving the requested web content, which frees the end-user device from the internet speed connections which cause long download times. If the customer storage server is interrupted while sending the web content to the end-user device, the customer storage server can resume sending the web content to the end-user device at the point of interruption, without restarting the download process at the beginning.

Figure 1:
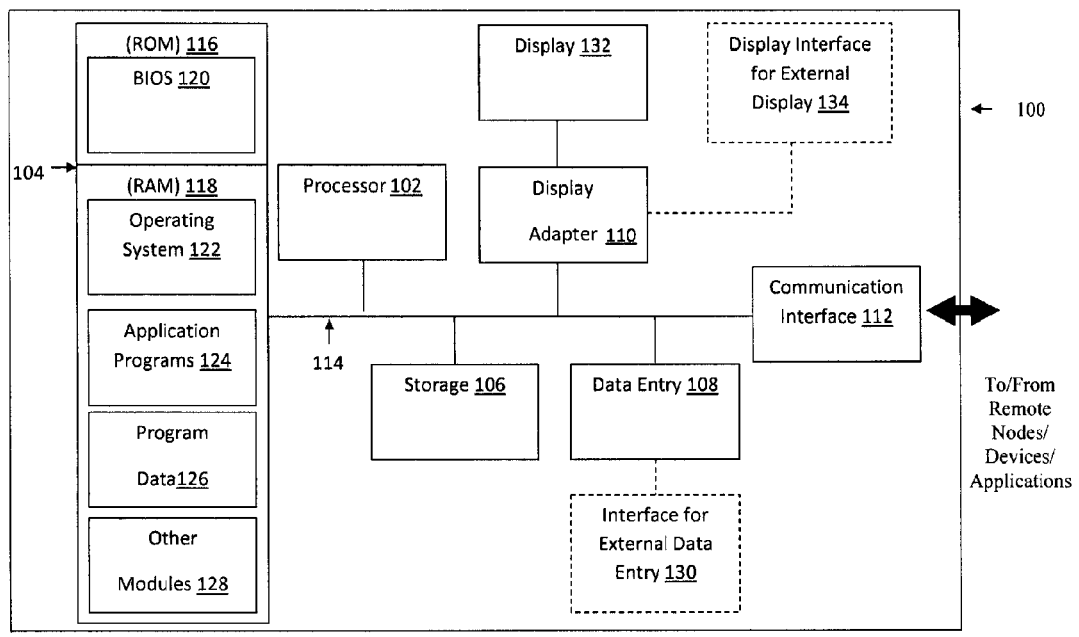
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for sending web content via asynchronous background processes.

Figure 2:
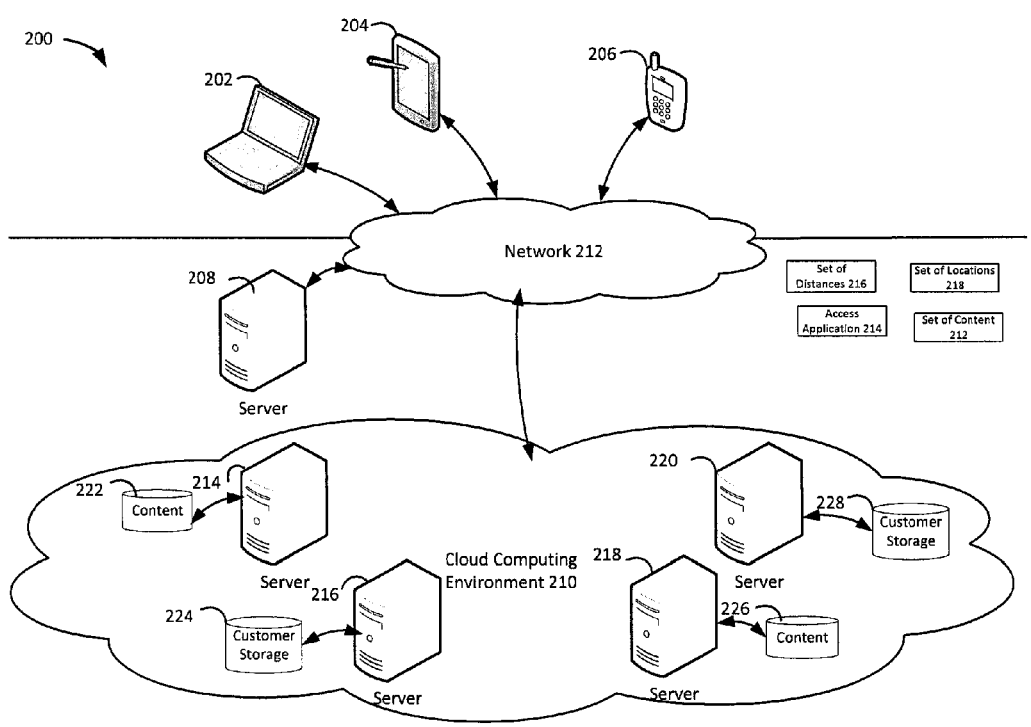
FIG. 2 illustrates a block diagram of an example system for sending web content via asynchronous background processes, under an embodiment.

FIG. 2 illustrates a block diagram of a system that implements sending web content via asynchronous background processes, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing environment that includes a first client 202, a second client 204, and a third client 206; and a web server 208 and a cloud computing system 210 that may be provided by a hosting company. The clients 202-206, the web server 208, and the cloud computing system 210 communicate via a network 212. The cloud computing system 210 includes a first content server 214, a first customer storage server 216, a second content server 218, a second customer storage server 220, a first set of content 222, a first customer storage 224, a second set of content 226, and a second customer storage 228. Although FIG. 2 depicts the system 200 with three clients 202-206, one web server 208, one cloud computing system 210, one network 212, two content servers 214 and 218, two customer storage servers 216 and 220, two sets of content 222 and 226, and two customer storages 224 and 228, the system 200 may include any number of clients 202-206, any number of web servers 208, any number of cloud computing systems 210, any number of networks 212, any number of content servers 214 and 218, any number of customer storage servers 216 and 220, any number of sets of content 222 and 226, and any number of customer storages 224 and 228. The clients 202-206 and the servers 208 and 214-220 may each be substantially similar to the system 100 depicted in FIG. 1.

A content server may upload web content. For example, the first content server 214 uploads the white paper file, stores the while paper file in the first set of content 222, and sends the white paper file to the second content server 218 in the cloud computing system 210, which stores the white paper file to the second set of content 226. Since the cloud computing system 210 includes multiple content servers 214 and 218 that serve multiple sets of content 222 and 226, end-users may access web content via the content server that is closest to the end-user's device. This is in contrast to systems that require global end-users to connect to a single centralized data center, which negatively impacts performance and customer experience for the global end-users.

A selection may be received of an option associated with sending web content from a customer storage server to an end-user device via an asynchronous background process, wherein the option is based on a time of day, a network accessibility associated with the end-user device, a type of network associated with the end-user device, a remaining bandwidth available associated with the end-user device, a service level agreement, a content type, and/or an end-user selected priority associated with the content type. For example, when a customer previously set up an account for the end-user devices 202-206 with the second customer storage server 220, the customer selected options for the second customer storage server 220 to send requested web content to the end-user devices 202-206 based on the end-user's specification for cadence of the delivery of the requested web content. Example options selected by the end-user may include only sending requested web content to the end-user's tablet computer 204 when the end-user's tablet computer 204 is communicating over the type of network that is available at the end-user's office at work, only sending requested web content to the end-user's mobile phone 206 during normal business hours when the end-user's mobile phone 206 is at the end-user's office at work, and only sending web content which is greater than a specified size to the end-user's laptop computer 202 which has sufficient storage capacity to store large files. In another example, any of the content servers 214-218 receive selections of options from the web server 208, which receives the selections of options from any of the end-user devices 202-206 when any of the end-user devices 202-206 are visiting a website supported by the webserver 208.

A content server receives an end-user device's request for web content from a webserver. For example, a customer uses the end-user device 202 to select a "sync" option on a website to request a white paper file, and the webserver 208 sends the request to the second content server 218 in the cloud computing system 210 because the second content server 218 is the content server which is geographically closest to the end-user device 202. A content server sends web content to a customer storage server associated with an end-user device. For example, the second content server 218 sends the requested white paper file to the second customer storage server 220, which stores the requested white paper file in the second customer storage 228 because the second customer storage server 220 is the customer storage server which is geographically closest to the end-user device 202 and because the customer has previously set up an account for the end-user device 202 with the second customer storage server 220.

A customer storage server sends web content to an end-user device via an asynchronous background process. For example, the second customer storage server 220 sends the requested white paper file to the end-user device 202 via an asynchronous background process, which enables the end-user device 202 to engage in a foreground process. The foreground process is independent of the asynchronous background process. The customer can use the end-user device 202 for something else while the end-user device 202 is receiving the requested white paper file, which frees the end-user device 202 from the internet speed connections that cause long download times.

Furthermore, when a customer storage server sends web content via an asynchronous background process, the customer storage server may send the web content to each of multiple end-user devices associated with the customer storage server. For example, when the second customer storage server 220 sends the requested white paper file to the end-user device 202 via an asynchronous background process, the second customer storage server 220 also sends the requested white paper file to the end-user devices 204 and 206 via asynchronous background processes because the customer registered each of the end-user devices 202-206 when setting up an account with the second customer storage server 220. Any downloaded web content is available from all of the end-user's other devices, and not locked to the end-user device which was used to request the downloaded web content.

If a customer storage server is interrupted while sending web content to an end-user device, the customer storage server may resume sending the web content to the end-user device at the point of interruption. For example, if the second customer storage server 220 is interrupted after sending 99% of the requested white paper file to the end-user device 202 via an asynchronous background process, the second customer storage server 220 may resume sending the requested white paper file to the end-user device 202 at the point of interruption, thereby sending only the remaining 1% of the requested white paper file to the end-user device 202, instead of resending the entire requested white paper file.

A content server may send an update for web content to a customer storage server. For example, the second content server 218 sends an update received for the previously requested white paper file to the second customer storage server 220 because the second content server 218 recorded the previous sending of the requested white paper file to the second customer storage server 220. A customer storage server may send an update for web content to an end-user device via an asynchronous background process. For example, the second customer storage server 220 sends the update received for the previously requested white paper file to the end-user device 202 because the second customer storage server 220 recorded the previous sending of the requested white paper file to the end-user device 202. In this manner, content servers and customer storage servers automatically send any updates for web content to the end users devices which previously received the web content, without requiring any human intervention after the update for the web content is provided to a single content server, thereby keeping end-users up to date with the latest versions of previously requested web content.

Figure 3:
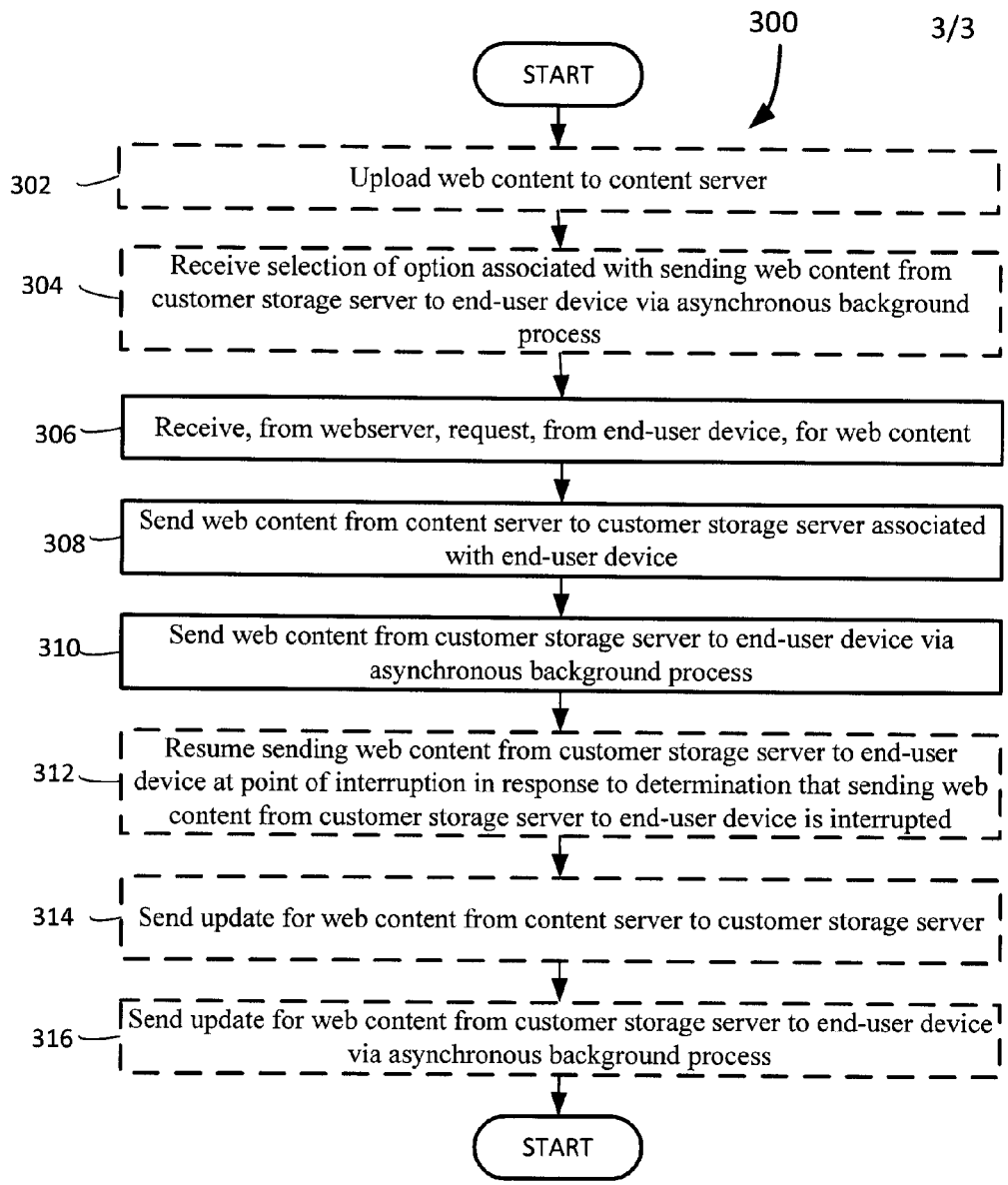
FIG. 3 is a flowchart that illustrates a method of sending web content via asynchronous background processes, under an embodiment.

FIG. 3 is a flowchart that illustrates a method for sending web content via asynchronous background processes, under an embodiment. Flowchart 300 illustrates method acts illustrated as flowchart blocks for certain steps involved in and/or between the clients 202-206 and/or the server 208 and 214-220 of FIG. 2.

A content server optionally uploads web content, block 302. For example, the first content server 214 uploads a white paper file, stores the while paper file in the first set of content 222, and sends the white paper file to the second content server 218 in the cloud computing system 210, which stores the white paper file to the second set of content 226. A selection is optionally received of an option associated with sending web content from a customer storage server to an end-user device via an asynchronous background process, block 304. For example, when a customer previously set up an account for the end-user devices 202-206 with the second customer storage server 220, the customer selected options for customer storage servers to send web content to the end-user devices 202-206. Having uploaded web content, and received any selections of options, a content server receives an end-user device's request for the web content from a webserver, block 306. For example, a customer uses the end-user device 202 to select a "sync" option on a website to request a white paper file, and the webserver 208 sends the request to the second content server 218 in the cloud computing system 210. Having received a request for web content, a content server sends the web content to a customer storage server associated with an end-user device, block 308. For example, the second content server 218 sends the requested white paper file to the second customer storage server 220, which stores the requested white paper file in the second customer storage 228.

Having received web content, a customer storage server sends the web content to an end-user device via an asynchronous background process, block 310. For example, the second customer storage server 220 sends the requested white paper file to the end-user device 202 via an asynchronous background process, which enables the end-user device 202 to engage in a foreground process which is independent of the asynchronous background process. If a customer storage server is interrupted while sending web content to an end-user device, the customer storage server optionally resumes sending the web content to the end-user device at the point of interruption, block 312. For example, if the second customer storage server 220 is interrupted after sending 99% of the requested white paper file to the end-user device 202 via an asynchronous background process, the second customer storage server 220 can resume sending the requested white paper file to the end-user device 202 at the point of interruption, thereby sending only the remaining 1% of the requested white paper file to the end-user device 202, instead of resending the entire white paper file.

After sending web content to a customer storage server, a content server may send an update for the web content to the customer storage server, block 314. For example, the second content server 218 sends an update received for the previously requested white paper file to the second customer storage server 220. After sending web content to an end-user device, a customer storage server may send an update for the web content to the end-user device via an asynchronous background process, block 316. For example, the second customer storage server 220 sends the update received for the previously requested white paper file to the end-user device 202.

Although FIG. 3 depicts the blocks 302-316 occurring in a specific order, the blocks 302-316 may occur in another order. In other implementations, each of the blocks 302-316 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for synching content via asynchronous background processes, the system comprising:
   a processor-based application, which when executed on a computer, will cause the processor to:
   receive, by a cloud-based content server via a webserver, a request for content from one of a plurality of end-user devices;
   send the content from the content server to a customer storage server associated with the plurality of end-user devices; and
   send the content from the customer storage server associated with the plurality of end-user devices to the plurality of end-user devices via asynchronous background processes.

2. The system of claim 1, wherein the content server is a content server of a plurality of content servers that is geographically closest to the end-user device and the customer storage server is a customer storage server of a plurality of customer storage servers that is geographically closest to the plurality of end-user devices.

3. The system of claim 1, wherein sending the content from the customer storage server to the plurality of end-user devices via asynchronous background processes enables the plurality of end-user devices to engage in a foreground processes that are independent of the asynchronous background processes and comprises sending the content via the asynchronous background processes to each of the plurality of end-user devices associated with the customer storage server.

4. The system of claim 1, wherein the processor-based application, when executed, will further cause the processor to receive a selection of an option associated with sending the content from the customer storage server to the plurality of end-user devices via the asynchronous background processes, wherein the option is based on at least one of a time of day, a network accessibility associated with the plurality of end-user devices, a type of network associated with the plurality of end-user devices, a remaining bandwidth available associated with the plurality of end-user devices, a service level agreement, a content type, and an end-user selected priority associated with the content type.

5. The system of claim 1, wherein the processor-based application, when executed, will further cause the processor to upload the content to the content server.

6. The system of claim 1, wherein the processor-based application, when executed, will further cause the processor to resume sending the content from the customer storage server to the plurality of end-user devices at a point of interruption in response to a determination that sending the content from the customer storage server to the plurality of end-user devices is interrupted.

7. The system of claim 1, wherein the processor-based application, when executed, will further cause the processor to:
   send an update for the content from the content server to the customer storage server; and
   send the update for the content from the customer storage server to the plurality of end-user devices via the asynchronous background processes.

8. A computer-implemented method for sending content via asynchronous background processes, the method comprising:
   receiving, by a cloud-based content server via a webserver, a request for content from one of a plurality of end-user devices;
   sending the content from the content server to a customer storage server associated with the plurality of end-user devices; and
   sending the content from the customer storage server associated with the plurality of end-user devices to the plurality of end-user devices via asynchronous background processes.

9. The method of claim 8, wherein the content server is a content server of a plurality of content servers that is geographically closest to the end-user device and the customer storage server is a customer storage server of a plurality of customer storage servers that is geographically closest to the plurality of end-user devices.

10. The method of claim 8, wherein sending the content from the customer storage server to the plurality of end-user devices via asynchronous background processes enables the plurality of end-user devices to engage in a foreground processes that are independent of the asynchronous background processes and comprises sending the content via the asynchronous background processes to each of the plurality of end-user devices associated with the customer storage server.

11. The method of claim 8, wherein the method further comprises receiving a selection of an option associated with sending the content from the customer storage server to the plurality of end-user devices via the asynchronous background processes, wherein the option is based on at least one of a time of day, a network accessibility associated with the plurality of end-user devices, a type of network associated with the plurality of end-user devices, a remaining bandwidth available associated with the plurality of end-user devices, a service level agreement, a content type, and an end-user selected priority associated with the content type.

12. The method of claim 8, wherein the method further comprises uploading the content to the content server.

13. The method of claim 8, wherein the method further comprises resuming sending the content from the customer storage server to the plurality of end-user devices at a point of interruption in response to a determination that sending the content from the customer storage server to the plurality of end-user devices is interrupted.

14. The method of claim 8, wherein the method further comprises:
   sending an update for the content from the content server to the customer storage server; and
   sending the update for the content from the customer storage server to the plurality of end-user devices via the asynchronous background processes.

15. A computer program product, comprising a non-transitory computer-readable medium having a computer-readable program code embodied therein to be executed by one or more processors, the program code including instructions to:
   receive, by a cloud-based content server via a webserver, a request for content from one of a plurality of end-user devices;
   send the content from the content server to a customer storage server associated with the plurality of end-user devices; and
   send the content from the customer storage server associated with the plurality of end-user devices to the plurality of end-user devices via asynchronous background processes.

16. The computer program product of claim 15, wherein the content server is a content server of a plurality of content servers that is geographically closest to the end-user device and the customer storage server is a customer storage server of a plurality of customer storage servers that is geographically closest to the plurality of end-user devices.

17. The computer program product of claim 15, wherein sending the content from the customer storage server to the plurality of end-user devices via asynchronous background processes enables the plurality of end-user devices to engage in a foreground processes that are independent of the asynchronous background processes and comprises sending the content via the asynchronous background processes to each of the plurality of end-user devices associated with the customer storage server.

18. The computer program product of claim 15, wherein the program code further includes instructions to receive a selection of an option associated with sending the content from the customer storage server to the plurality of end-user devices via the asynchronous background processes, wherein the option is based on at least one of a time of day, a network accessibility associated with the plurality of end-user devices, a type of network associated with the plurality of end-user devices, a remaining bandwidth available associated with the plurality of end-user devices, a service level agreement, a content type, and an end-user selected priority associated with the content type.

19. The computer program product of claim 15, wherein the program code further includes instructions to resume sending the content from the customer storage server to the plurality of end-user devices at a point of interruption in response to a determination that sending the web content from the customer storage server to the plurality of end-user devices is interrupted.

20. The computer program product of claim 15, wherein the program code further includes instructions to:
- send an update for the content from the content server to the customer storage server; and
- send the update for the content from the customer storage server to the plurality of end-user devices via the asynchronous background processes.

* * * * *